(12) United States Patent
Vullings

(10) Patent No.: US 9,506,494 B2
(45) Date of Patent: Nov. 29, 2016

(54) EXPANDING FASTENER

(75) Inventor: Peter Vullings, Palmerston North (NZ)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 230 days.

(21) Appl. No.: 14/117,618

(22) PCT Filed: Jan. 26, 2012

(86) PCT No.: PCT/US2012/022806
§ 371 (c)(1),
(2), (4) Date: Nov. 13, 2013

(87) PCT Pub. No.: WO2013/112165
PCT Pub. Date: Aug. 1, 2013

(65) Prior Publication Data
US 2015/0139748 A1    May 21, 2015

(51) Int. Cl.
*F16B 19/10*    (2006.01)
*F16B 39/02*    (2006.01)
(Continued)

(52) U.S. Cl.
CPC ............ *F16B 39/02* (2013.01); *F16B 5/0642* (2013.01); *F16B 2/065* (2013.01); *F16B 13/12* (2013.01); *F16B 19/109* (2013.01); *F16B 29/00* (2013.01); *F16B 35/005* (2013.01)

(58) Field of Classification Search
CPC .. F16B 19/109; F16B 13/124; F16B 13/126; F16B 13/128; F16B 13/12; F16B 13/0833
USPC .................................. 144/347, 348, 21, 55
See application file for complete search history.

(56) References Cited

U.S. PATENT DOCUMENTS 1,700,354 A * 1/1929 Foss .................... F16B 19/1081
411/55
1,926,798 A * 9/1933 Baumbach ................ F16B 2/16
279/2.12

(Continued)

OTHER PUBLICATIONS

"Hollow Wall Anchors", Slegers Installation Products, Feb. 1, 2014, Accessed at http://web.archive.org/web/20150102092719/http://www.cbi-electric.com.au/images/PDF/hollow_wall_anchors_-_new.pdf, Accessed on Jan. 2, 2015, pp. 2.
(Continued)

*Primary Examiner* — Flemming Saether
(74) *Attorney, Agent, or Firm* — Amin, Turocy & Watson, LLP

(57) ABSTRACT

Fasteners are generally described. In some examples, a fastener can be secured to a first member or it can secure a second (or further) member to the first member. The example fastener can include a body for location with respect to the first member. The example fastener can also include at least one latch which can be located with respect to the body. The latch can move laterally with respect to the body from a non-latching position to a latching position. The example fastener can also include an actuator. The actuator can protrude from the body as the actuator moves from an inactive position to an active position. When the actuator is in the inactive position and the at least one latch is in the non-latching position, the body can be located with respect to the first member. When the actuator is moved to the active position, a part of the actuator which protrudes from the body can cause the at least one latch to move laterally to the latching position such that it is able to latch behind the first member (or behind second or further members) to facilitate securement of the fastener thereto.

25 Claims, 5 Drawing Sheets

(51) Int. Cl.
*F16B 5/06* (2006.01)
*F16B 13/12* (2006.01)
*F16B 2/06* (2006.01)
*F16B 29/00* (2006.01)
*F16B 35/00* (2006.01)

(56) References Cited

U.S. PATENT DOCUMENTS

| | | | | |
|---|---|---|---|---|
| 2,353,851 | A * | 7/1944 | Rosan | F16B 13/126 227/52 |
| 2,370,327 | A * | 2/1945 | Rosan | F16B 13/12 411/80.2 |
| 2,822,986 | A * | 2/1958 | Schreier | E01B 9/14 238/377 |
| 3,373,648 | A | 3/1968 | Pitzer | |
| 3,474,506 | A * | 10/1969 | Metz | F16B 19/109 411/347 |
| 4,278,120 | A * | 7/1981 | Hart | F16B 39/04 411/190 |
| 5,803,689 | A * | 9/1998 | Magnus | E21B 41/0007 24/607 |
| 6,896,460 | B2 | 5/2005 | Enomoto et al. | |
| 7,628,366 | B2 | 12/2009 | Scott | |
| 8,549,724 | B2 * | 10/2013 | Davies | F16B 2/16 29/428 |
| 2005/0169726 | A1 | 8/2005 | McClure | |
| 2008/0056841 | A1 | 3/2008 | Zimmerer | |
| 2009/0064488 | A1 * | 3/2009 | Davies | F16B 2/16 29/700 |
| 2013/0039715 | A1 * | 2/2013 | Daykin | F16B 13/0808 411/21 |
| 2014/0112731 | A1 * | 4/2014 | Bone | F16B 21/12 411/21 |

OTHER PUBLICATIONS

"Hollow Wall Fasteners", ITW PROLINE, Jan. 2, 2012, Accessed at http://web.archive.org/web/20120102140515/http://www.itwproline.com.au/Hollow-Wall-Fasteners/default.aspx, Accessed on Jan. 2, 2015, pp. 2.

International Search Report and Written Opinion mailed Jun. 12, 2012 for PCT Application Serial No. PCT/US12/22806, 12 pages.

* cited by examiner

EXPANDING FASTENER

CROSS-REFERENCE TO THE RELATED APPLICATION

The present application is a U.S. national stage application under 35U.S.C. §371 of PCT Application No. PCT/US2012/022806, filed Jan. 26, 2012, and entitled "EXPANDING FASTENER," the disclosure of which is incorporated herein by reference in its entirety.

BACKGROUND

Unless otherwise indicated herein, the materials described in this section are not prior art to the claims in this application and are not admitted to be prior art by inclusion in this section.

In buildings, including in pre-fabricated buildings, components are secured to walls, ceilings, floors, frames, etc using permanent fasteners. In addition, components such as internal walls, cabinetry, shelves, fixtures, fittings, pictures, etc are erected and fastened together on site, and may be uncoupled for internal space reorganization, for alternative use of space, or for deconstruction and removal of the building.

Where permanent fasteners have been employed to fasten such components together this can hinder the uncoupling of components and deconstruction of the building. Also, the components can be damaged, requiring repair or replacement.

SUMMARY

In some embodiments, a fastener is generally described. An example fastener may be configured for securing to a first member. The example fastener may include a body for location with respect to the first member. The example fastener may also include at least one latch which may be located with respect to the body and may be able to be moved laterally with respect to the body from a non-latching position to a latching position. The example fastener may also include an actuator which may be able to protrude from the body as the actuator moves from an inactive position to an active position. When the actuator is in the inactive position and the at least one latch is in the non-latching position, the body may be able to be located with respect to the first member. When the actuator is moved to the active position, a part of the actuator which protrudes from the body may cause the at least one latch to move laterally to the latching position such that it is able to latch behind the first member to facilitate securement of the fastener thereto.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
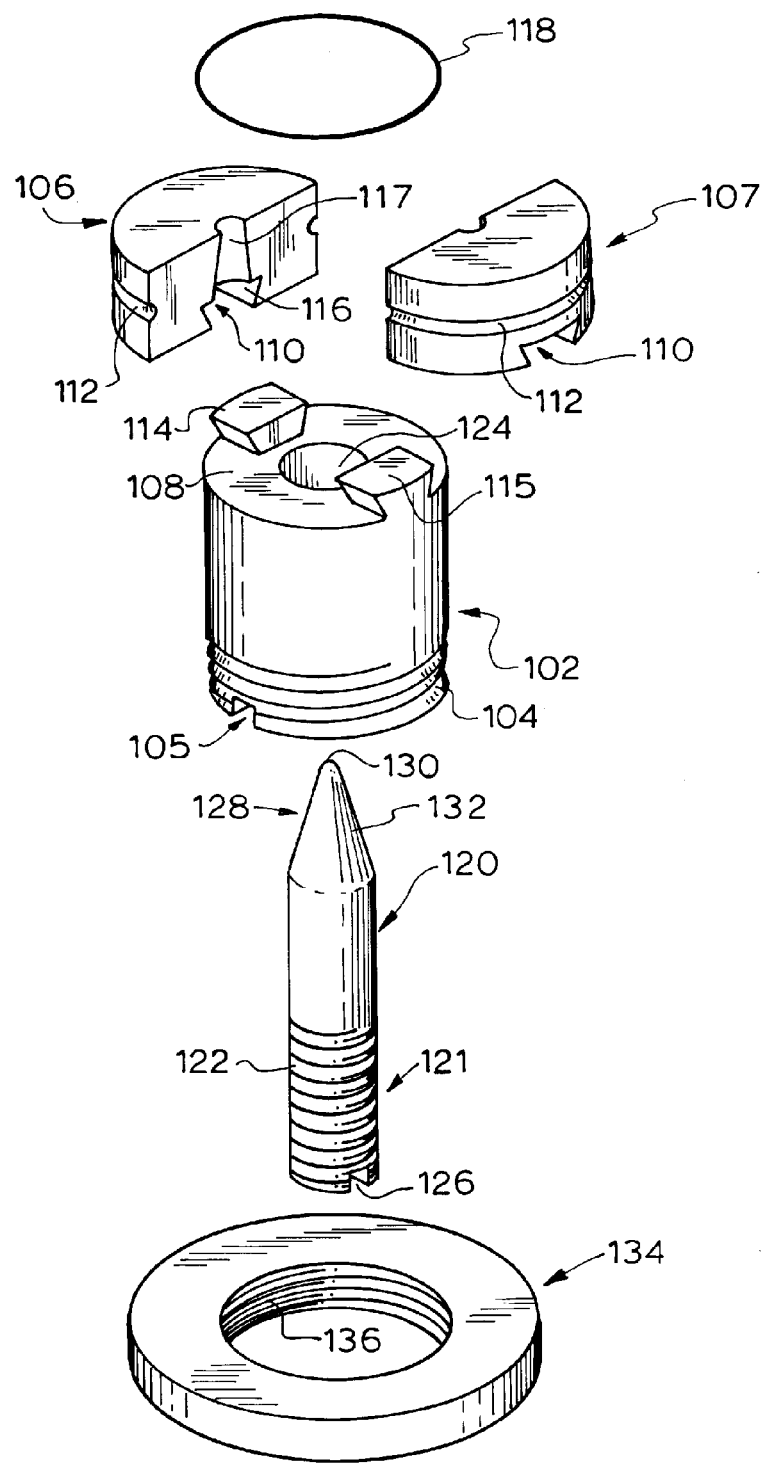
FIG. 1 shows a diagrammatic exploded perspective view of a first example fastener.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally directed, inter alia, to methods, apparatus, systems, and members that employ a fastener for securing to a first member, or for securing together first and second (or further) members.

Briefly stated a fastener is generally disclosed. An example fastener can be secured to a first member (e.g. it can be mounted to the first member). The example fastener can be employed to secure a second (or further) member to the first member (e.g. it can mount to each of the first and further members). The example fastener may include a body for being located with respect to (e.g. positionable for mounting to) the first member. The example fastener may also include at least one latch which may be located with respect to the body. The latch may move laterally with respect to the body from a non-latching position to a latching position. The example fastener may also include an actuator. The actuator may protrude from the body as the actuator moves from an inactive position to an active position.

When the actuator is in the inactive position and the at least one latch is in the non-latching position, and the body may be able to be located with respect to the first member. When the actuator is moved to the active position, a part of the actuator which protrudes from the body may cause the at least one latch to move laterally to the latching position such that it is able to latch behind the first member (or behind second or further members) to facilitate securement (e.g. mounting) of the fastener thereto.

Figure 2:
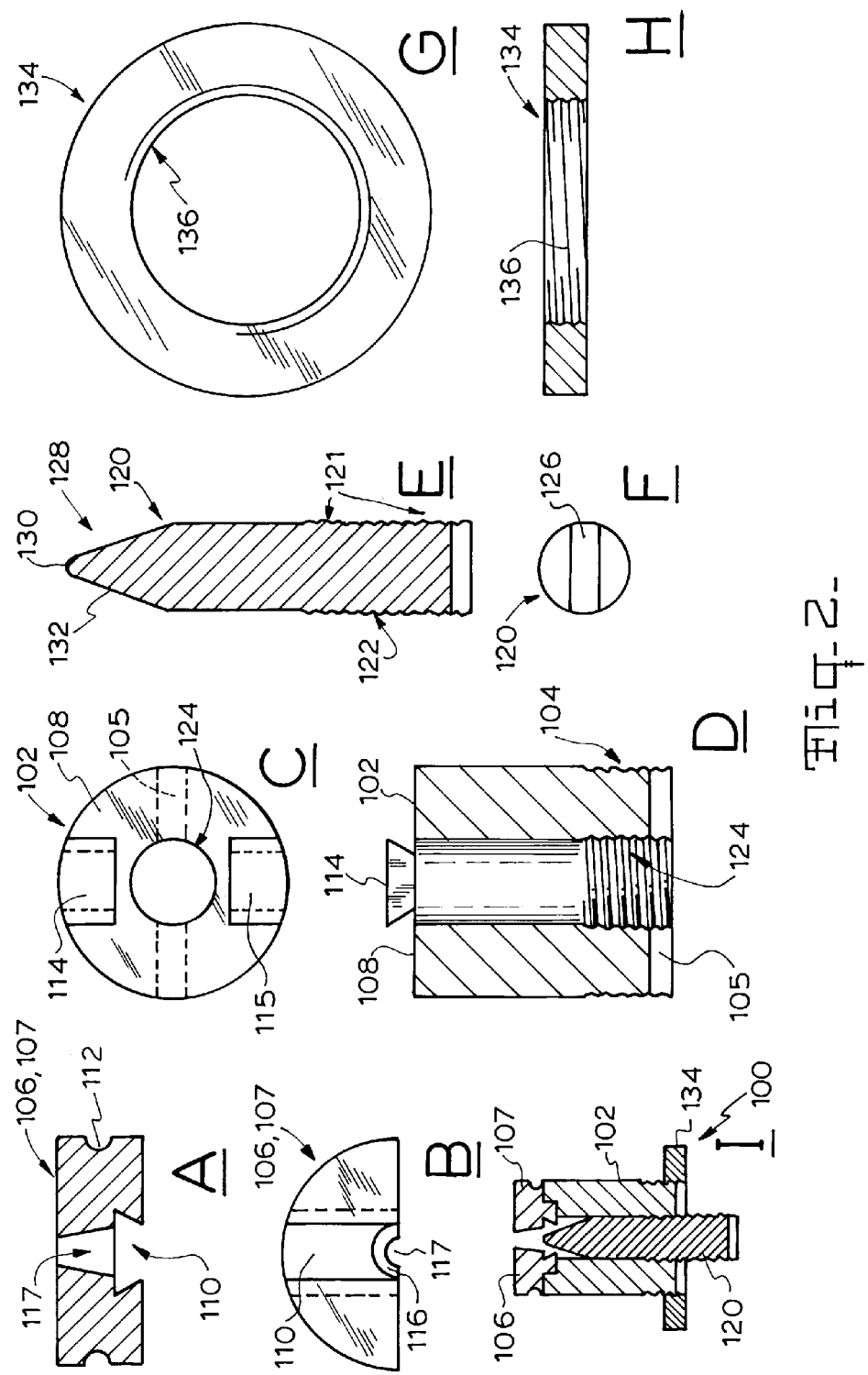
FIGS. 2A and 2B show diagrammatic side and plan views of a latching component of the first example fastener.
FIGS. 2C and 2D show diagrammatic plan and side views of a body component of the first example fastener.
FIGS. 2E and 2F show diagrammatic side and underside plan views of an actuator component of the first example fastener.
FIGS. 2G and 2H show diagrammatic plan and side views of a ring component of the first example fastener.
FIG. 2I shows a diagrammatic side sectional view of the first example fastener assembled from the components of FIGS. 2A to 2H.

FIG. 1 is a diagrammatic exploded perspective representation of a first example fastener 100 that is arranged according to at least some embodiments described herein. FIG. 2 shows various components of the fastener 100, with FIG. 2I showing the various components of the fastener 100 assembled such that the fastener is ready for actuation and use.

Figure 3:
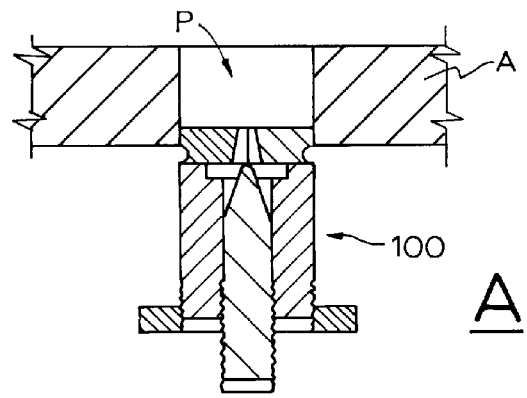
FIGS. 3A to 3D respectively show diagrammatic side section views of the first example fastener in progressive stages of movement from an non-secured orientation to a secured orientation when being secured to a first member A.
Figure 3:
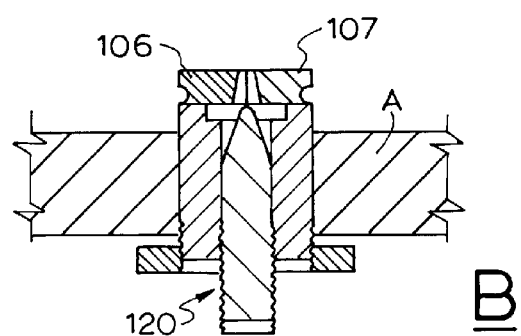
Figure 3:
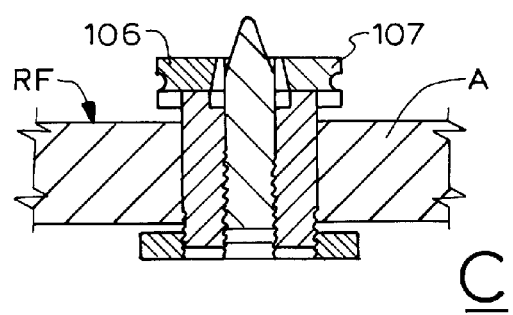
Figure 3:
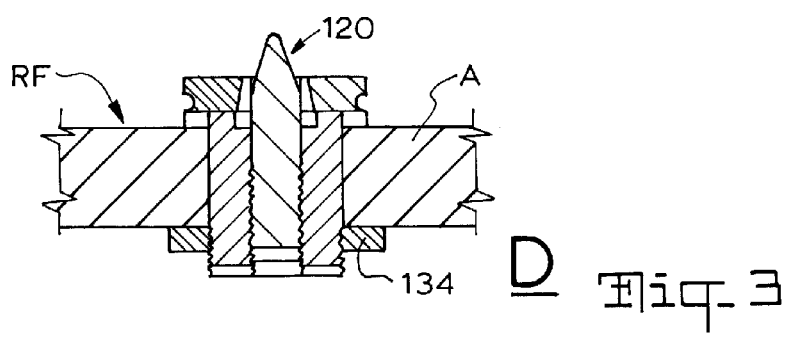
Figure 4:
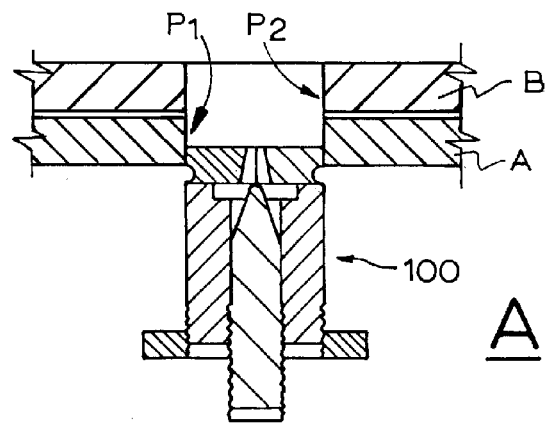
FIGS. 4A to 4D respectively show diagrammatic side section views of the first example fastener in progressive stages of movement from an non-secured orientation to a secured orientation when securing together a first member A and a second member B.
Figure 4:
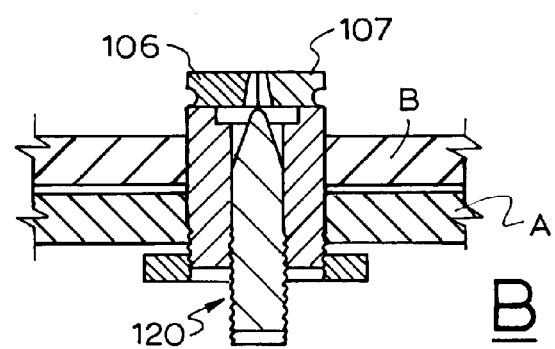
Figure 4:
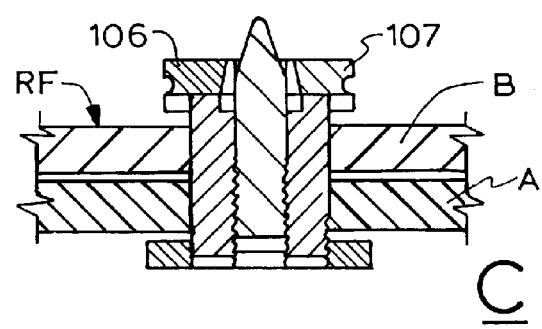
Figure 4:
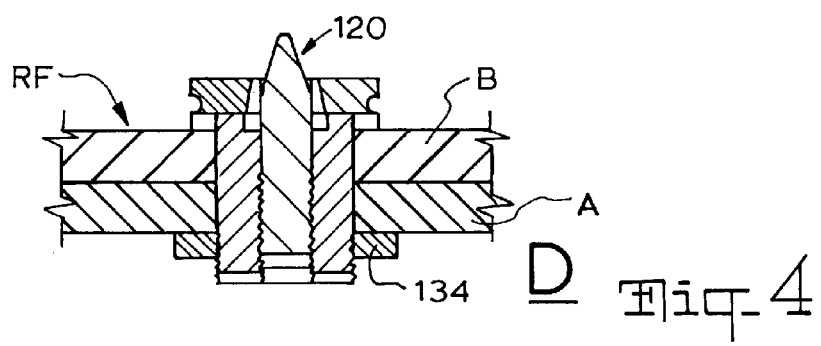

The first example fastener 100 has a body in the form of a cylindrical sleeve 102. The sleeve can be inserted to extend through a passage P defined in a first member A (FIG. 3). Alternatively, the sleeve 102 may extend through aligned passages $P_1$ and $P_2$ defined in first and second adjacent members A and B (FIG. 4).

A lower end of the sleeve 102 is externally threaded 104 to enable its secure mounting at a front face F of the first member A via a securing mechanism (e.g. such as a securing ring), as described below. The lower end 104 of sleeve 102 may also be provided with opposed notches or cut-out passages 105 for engagement by a suitable tool to rotate the sleeve, as described below.

The first example fastener 100 has latches in the form of two laterally movable and opposing wedges 106, 107, each locatable with respect to an upper end 108 of the sleeve 102. The fastener may alternatively have one, three or more wedges, with the size of each wedge and of the upper end 108 of the sleeve 102 being adjusted accordingly. Multiple wedges can allow for the even application of a securing force at the first and/or second members A and B.

Each wedge 106 and 107 is provided with a dovetail recess 110 and an intermediate groove 112. Each dovetail recess 110 is configured to receive therein, for lateral sliding on, a respective dovetail formation 114, 115. Each such formation protrudes integrally from the upper end 108 of the sleeve 102. The in-use outer end of each dovetail recess 110 can be closed, crimped or otherwise narrowed to prevent each wedge from sliding off its respective dovetail formation 114, 115 (i.e. to retain the wedges on the sleeve 102 in use). A semi-circular opening 116 is provided at an in-use inner end of each dovetail recess 110. A tapered channel 117 extends upwardly in the wedge and tapers inwardly from each semi-circular opening 116, with the semi-circular openings 116 and channels 117 of the wedges 106, 107 opposing each other when the wedges are located adjacent to each other. Also, the wedges are configured such that, when they are located adjacent to each other, they do not protrude to any extent beyond the sleeve 102.

The intermediate groove 112 of each wedge 106, 107 is configured to receive part of an elastomeric (e.g. rubber) O-ring 118 therein. The O-ring 118 biases the wedges 106, 107 towards each other when each is mounted to its respective dovetail formation 114, 115. However, the O-ring 118 is also able to stretch to allow the wedges to be moved (e.g. urged) laterally away from each other in opposite directions in use.

The first example fastener 100 also has an actuator in the form of a pin 120 that is axially movable within the sleeve 102. For example, a lower end 121 of the pin 120 is externally threaded 122 for screw mounting with e.g. a corresponding internal thread formed in a bore 124 of the sleeve 102. Thus the pin 120 can be screw mounted to the sleeve for securement thereto and which can also enable its actuation. In this regard, the pin lower end 121 has a slot 126 formed therein for engagement by a tool (e.g. the head of a screwdriver). Other formations at the pin lower end 121 (e.g. a hex-end, Philips-head end, Allen key slot, etc) are possible. The pin may be caused to rotate manually (such as by a hand-held tool) or by a mechanical drive (e.g. a bit of a powered drill). The pin lower end 121 may also protrude beyond the lower end of sleeve 102 to enable it to be provided with a handle, pulley or other device attached thereto, to allow it to be activated more easily by hand or by mechanical means (e.g. a drive or motor).

The pin 120 also has a tapered end 128, which tapers to a point 130. When the pin 120 is caused (e.g. actuated) to protrude from the upper end 108 of the sleeve 102, the point 130 starts to protrude into the opposed semi-circular openings 116 of each dovetail recess 110 (see FIG. 2I). As explained below, a conical surface 132 of the tapered end 128 eventually extends into and engages with the tapered channels 117.

The first example fastener 100 may also be provided with a securing mechanism to enable the fastener to interact with the external face F of the first member A. In one embodiment the securing mechanism can take the form of a securing ring 134 that is axially movable with respect to the sleeve 102. In other embodiments the securing mechanism can take the form of a fixed or movable flange or lug (e.g. slidable along the sleeve), or step-formation in the sleeve, etc.

In the embodiment depicted, the externally threaded lower end 104 of the sleeve 102 is able to receive thereon a corresponding internal thread formation 136 of the securing ring 134. Axial movement of the securing ring 134 along the sleeve 102 can bring the securing ring into abutment with the external face F of the first member A (see FIGS. 3D and 4D) to enable securement (e.g. mounting) of the fastener 100 thereto. The example assembled fastener 100 as shown in FIG. 2I is ready for operation.

In FIGS. 2I, 3A and 4A the example fastener 100 is shown in a non-secured position. In this position, the wedges 106, 107 are located adjacent to each other (urged by O-ring 118) and within a peripheral envelope as defined by a perimeter of the sleeve 102. In this non-secured position the fastener 100 is able to be positioned at the first member A (FIGS. 3A and 3B) by being inserted through circular passage P, or it may be positioned in relation to the first and second members A and B (FIGS. 4A and 4B) by being inserted through aligned circular passages $P_1$ and $P_2$. In FIG. 3A the example fastener 100 is shown at the commencement of its insertion through passage P, and in FIG. 4A the example fastener 100 is shown at the commencement of its insertion through aligned passages $P_1$ and $P_2$. In FIGS. 3B and 4B the example fastener 100 is shown having been sufficiently inserted through the passage P, or through aligned passages $P_1$ and $P_2$, such that the wedges 106, 107 are now freely able to be displaced laterally away from each other.

It should also be appreciated that the non-secured position does not require the wedges to be fully within the peripheral envelope, and the passage P or aligned passages $P_1$ and $P_2$ could be resized accordingly. However, the location of the wedges within the peripheral envelope enables the sleeve 102 to be snugly (or closely) received within the passage P or within aligned passages $P_1$ and $P_2$, as depicted.

It should also be appreciated that the sleeve 102 and thus the passage P or aligned passages $P_1$ and $P_2$ may have cross-sectional shapes other than circular. For example, the sleeve 102 and passages P, $P_1$ and $P_2$ may each have a corresponding square, hexagonal, octagonal, etc cross-sectional shape, or may employ other examples of regular polygons for the cross-sectional profile. Alternatively, the sleeve 102 and passages P, $P_1$ and $P_2$ may each have a corresponding but irregular cross-sectional shape which requires insertion in one fastener orientation only.

In FIGS. 3C and 4C the example fastener 100 is shown in an "actuated" orientation with the wedges 106, 107 having been displaced laterally away from each other. In this regard, an underside face of each wedge now faces either a rear face RF of first member A (FIG. 3C), or a rear face RF of second member B (FIG. 4C). The fastener 100 is actuated by advancing the pin 120 with respect to sleeve 102, such that it protrudes beyond the sleeve, and such that the conical surface 132 at the pin tapered end 128 starts to engage with the opposing tapered channels 117 of the wedges 106, 107, to thereby cause the wedges to be displaced laterally and away from each other. The pin 120 is advanced by rotating it in a given direction with a suitable tool engaging e.g. the slot 126 at lower end 121, whereby the threads 122 inter-engage with the corresponding threads in bore 124 of sleeve 102.

In FIGS. 3D and 4D the example fastener 100 is shown in a secured or mounted orientation in which the wedges 106, 107 remain laterally displaced, and the underside face of each wedge now abuts the rear face RF of first member A (FIG. 3D), or abuts the rear face RF of second member B (FIG. 4D). The fastener 100 is secured or mounted by a relative movement of the securing ring 134 with respect to sleeve 102. For example, the securing ring 134 can be caused to advance in along the sleeve 102, by rotating it so that its internal thread formation 136 inter-engages with the externally threaded lower end 104 of sleeve 102, and until the ring starts to engage with the front face F of the first member A. Rotation of the ring 134 may be with a suitable ring tool engaging e.g. with opposed external slots or notches on the ring. Alternatively, a suitable tool can engage with the notches or passages 105 of sleeve 102 to cause it to rotate relative to the sleeve.

In either case, further advancement of the ring 134 on the sleeve 102 causes the ring to urge against front face F, whereby sleeve 102 is urged back through the ring, drawing the wedges 106, 107 into abutment with the rear face RF of the first member A (FIG. 3D), or the rear face RF of second member B (FIG. 4D).

Eventually a tightened configuration of ring and wedges is reached. In this regard, the first member A is securely sandwiched between the ring 134 and the wedges 106, 107, or the first and second members A and B are securely sandwiched between the ring 134 and the wedges 106, 107. This either mounts the example fastener 100 to member A, or mounts the example fastener 100 to and secures together the first and second members A and B.

It should be understood that where three or more members are to be secured together, the sleeve 102 and, as necessary, the pin 120 can be lengthened such that the example fastener is able to be inserted right through aligned passages $P_1$, $P_2$, $P_3$, etc, to locate the wedges 106, 107 there beyond.

Figure 5:
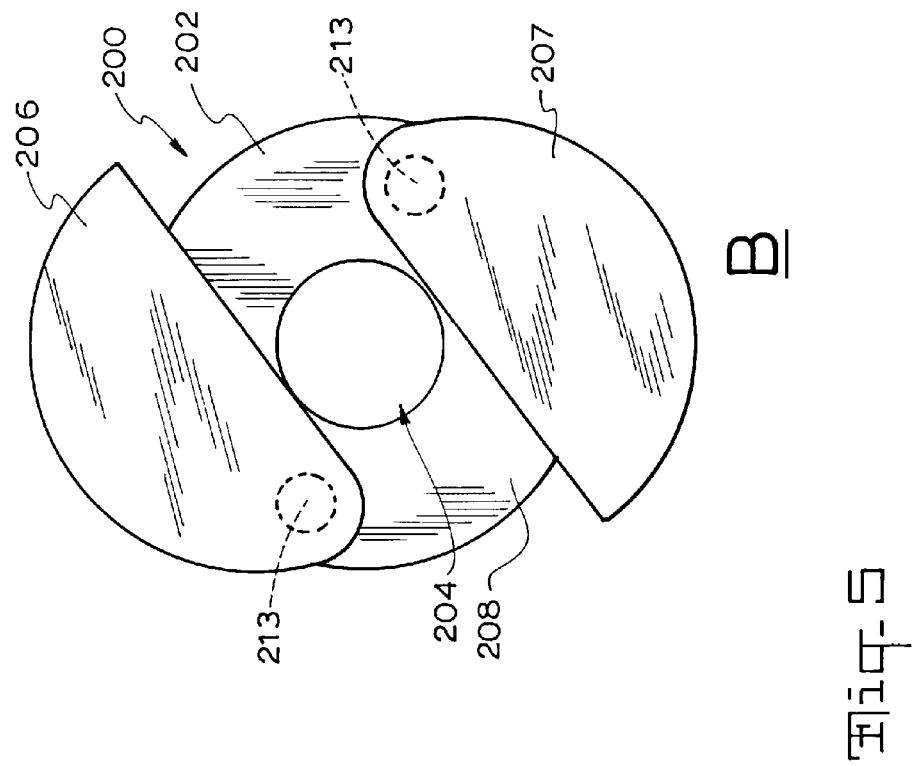
FIGS. 5A and 5B respectively show diagrammatic plan views of a second example fastener in a non-secured orientation and a secured orientation, with FIG. 5C showing a diagrammatic perspective view of a latching component of the second example fastener, all arranged according to at least some embodiments described herein.
Figure 5:
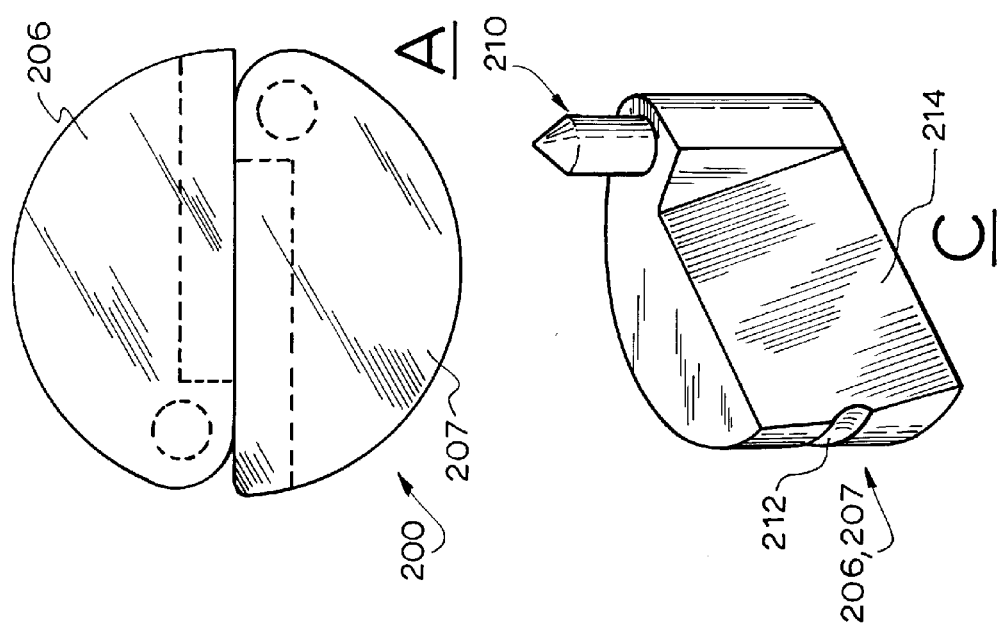

FIGS. 5A and 5B are diagrammatic plan representations of a second example fastener 200 depicted in non-secured (FIG. 5A) and secured (FIG. 5B) orientations respectively. FIG. 5C is a diagrammatic perspective underside representation of a latch component for the second example fastener 200. Again, the second example fastener 200 can secure (e.g. mount) to a first member A, or it can mount to and secure together a first member A and a second member B (or optionally further members).

In a similar manner to the first example fastener 100, the second example fastener 200 has a body in the form of a cylindrical sleeve 202. The sleeve can be inserted to extend through a passage P defined in a first member A, or the sleeve may extend through aligned passages $P_1$ and $P_2$ defined in first and second adjacent members A and B, etc.

In a similar manner to the first example fastener 100, the sleeve 202 of the second example fastener 200 can co-operate with an actuator in the form of a pin threadably mounted internally of the sleeve 202 in bore 204, and with a securing ring threadably mounted externally of the sleeve 202.

The second example fastener 200 differs from the first example fastener 100 in that, instead of wedges 106, 107, latches in the form of two pivotable segment-like catches 206, 207 are each locatable with respect to an upper end 208 of the sleeve 202. The example fastener may alternatively be provided with one, three or more catches, with the size of each catch and of the upper end 208 of the sleeve 202 being adjusted accordingly. Again, multiple catches can allow for an even securing force at first and/or second members A and B.

Each catch 206 and 207 is provided with an integral pivot pin 210 that extends downwardly therefrom at an end of the catch. Like the wedges 106, 107, each catch 206 and 207 is provided with an intermediate groove 212 for receipt of part of an elastomeric O-ring therein. Each pivot pin 210 is configured to be received in a corresponding and discrete pivot recess 213 formed in the upper end 208 of the sleeve 202. The receipt of pivot pin 210 in pivot recess 213 allows each catch 206 and 207 to pivot laterally out and back with respect to the sleeve 202, as illustrated by FIGS. 5A and 5B.

An underside of each catch 206 and 207 is provided with a bevelled face 214. Each such face locates above the bore 204 when the catches are located adjacent to each other in the fastener non-secured position (FIG. 5A); i.e. as urged together by the elastomeric O-ring. Again, the O-ring is also able to stretch to allow the catches 206 and 207 to be pivoted (e.g. by being urged) away from each other in use (FIG. 5B). In the non-secured orientation the bevelled faces 214 of the catches 206, 207 oppose each other. Also, the catches are usually also configured such that, when they are located adjacent to each other, they do not protrude to any extent beyond the sleeve 202.

In a similar manner to the first example fastener 100, the second example fastener 200 is actuated by advancing the pin with respect to sleeve 202 (i.e. by rotating it within the sleeve bore 204 in a given direction with a suitable tool), and such that the pin protrudes beyond the sleeve. Eventually the conical surface at the tapered end of the pin starts to engage with the opposing bevelled faces 214 of the catches 206, 207, to thereby cause the catches to pivot laterally out from the sleeve and away from each other (FIG. 5B).

In a similar manner to the first example fastener 100, the securing ring is advanced axially in along the sleeve 202 (by rotating it or the sleeve with a suitable tool) and until the ring starts to engage with the front face F of the first member A. Further advancement of the ring on the sleeve 202 causes the sleeve 202 to be urged back through the ring, drawing the now laterally pivoted catches 206, 207 into abutment with the rear face RF of the first member A, or with the rear face RF of second member B.

Again, a tightened configuration of ring and catches is reached. In this regard, the first member A is securely sandwiched between the ring and the catches 206, 207, or the first and second members A and B are securely sandwiched between the ring and the catches 206, 207. This either mounts the example fastener 200 to member A, or mounts the example fastener 200 to and secures together the first and second members A and B.

The first and second example fasteners 100 and 200 may be employed to secure to a first member A that may take the form of a component such as a wall, ceiling, floor, door, shelf, fixture, cabinetry, furniture item, wall mounting, fixture, fitting, etc. The first and second example fasteners 100 and 200 may in turn allow for other items (e.g. fittings, furnishings, etc) to be secured to the first member A. Also, the second member B may also take the form of a component such as a wall, ceiling, floor, door, shelf, fixture, cabinetry, furniture item, wall mounting, fixture, fitting, etc. Such components A and B may be found in, for example, originally constructed (e.g. built from the ground up) and prefabricated buildings Like and unlike components A and B may be fastened together using the example fasteners 100 and 200.

It should be appreciated that the first and second example fasteners 100 and 200 are not limited to use with components in buildings, and may be used to secure to and to secure together a range of different components in vehicles, installations, machinery, etc.

The first and second example fasteners 100 and 200 may be supplied in a prior-attached configuration to a given member (e.g. before it is used in the building or construction). Other components may then be mounted on site to the first and second pre-attached fasteners 100 and 200.

Each of the components of the example fasteners 100, 200 may be fabricated of any suitable material, such as plastic, steel, aluminium, etc. The material selected may relate to the size, purpose and required strength/durability of the example fastener 100, 200.

The example fasteners 100, 200 may be non-permanent, self-locating, activated manually, mechanically/electrically (e.g. by use of an electrically powered tool), are simple in design and can be made of a variety of materials depending on the application.

While the above description is concerned with fasteners for use with components in buildings (built on site and prefabricated) it will be understood that the fasteners are not limited to such applications. For example, it may be used as a fastener in cabinetry, furniture, machinery, vehicles, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a fastener having at least one of A, B, and C" would include but not be limited to fasteners that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a fastener having at least one of A, B, or C" would include but not be limited to fasteners that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A fastener, comprising:
a body configured to pass through a member;
at least one latch configured to be moved laterally with respect to the body from a non-latching position to a latching position, wherein the lateral movement is constrained by a corresponding slideable interface between the at least one latch and the body,
   wherein the least one latch is configured for lateral movement corresponding to an elongate axis of the corresponding slideable interface with respect to the body from the non-latching position to the latching position,
   wherein the least one latch is slidably coupled to the body via a corresponding track and guide slideable interface, and
   wherein the corresponding track and guide slideable interface comprises a dovetail joint orientated to enable the least one latch to slide laterally with respect to the body between the non-latching position and the latching position; and
an actuator configured to protrude from the body as the actuator moves from an inactive position to an active position,
   wherein, when the actuator is in the inactive position and the at least one latch is in the non-latching position, the body is moveable with respect to the member and, when the actuator is moved to the active position, a part of the actuator that protrudes from the body causes the at least one latch to move laterally to the latching position, and wherein, in the latching position, the at least one latch is behind the member to facilitate securement of the fastener to the member.

2. The fastener of claim 1, wherein the part of the actuator that protrudes is configured to engage with the at least one latch to move the at least one latch to the latching position as the actuator is moved to the active position.

3. The fastener of claim 2, wherein the actuator comprises a tapered end that is configured to engage with the at least one latch, and wherein, as the tapered end moves past the at least one latch, the at least one latch moves to the latching position.

4. The fastener of claim 3, wherein the at least one latch comprises a beveled internal face arranged to be engaged by the tapered end of the actuator as the at least one latch moves to the latching position.

5. The fastener of claim 1, wherein the actuator is elongate, with a portion of the actuator being externally threaded and with part of the body being correspondingly internally threaded, and wherein rotation of the actuator in one direction about an elongate axis causes the external and internal threads to engage, resulting in movement of the actuator to the active position.

6. The fastener of claim 1, wherein the body comprises a projection configured to engage at a front face of the member to enable securement of the fastener to the member.

7. The fastener of claim 6, wherein the projection comprises a ring that extends around a periphery of the body.

8. The fastener of claim 7, wherein an inside edge of the ring is internally threaded and part of an external surface of the body is correspondingly externally threaded, and wherein a relative rotation of the ring with respect to the body in a defined direction causes the ring to engage against the front face of the member.

9. The fastener of claim 8, wherein continued relative rotation of the ring and the body in the defined direction causes the at least one latch to be urged against an opposing rear face of the member.

10. The fastener of claim 1, wherein the at least one latch comprises at least two latches that move laterally with respect to the body between the non-latching position and the latching position.

11. The fastener of claim 10, further comprising a retainer configured to retain the at least two latches in the non-latching position, and enable the at least two latches to be moved laterally to the latching position in response to being urged by the part of the actuator that protrudes from the body.

12. The fastener of claim 11, wherein the retainer comprises a ring of resilient material configured to extend around the at least two latches and urge them to the non-latching position.

13. The fastener of claim 1, wherein the fastener is configured to secure the member to one or more further members, and wherein the at least one latch is configured to latch behind an outermost member of the one or more further members.

14. The fastener of claim 1, further comprising the member.

15. The fastener of claim 1, wherein the body is located to extend through a hole that is preformed in the member.

16. The fastener of claim 1, wherein the fastener is configured to secure the member to one or more further members.

17. The fastener of claim 16, wherein respective one or more holes are preformed in the one or more further members, and wherein the body is sized to extend through a hole of the member and the respective one or more holes of the one or more further members.

18. The fastener of claim 1, wherein the least one latch is mounted to the body.

19. The fastener of claim 1, wherein the fastener is adapted to be secured to the member during fabrication of the member.

20. The fastener of claim 1, further comprising one or more further members, wherein the fastener is configured to secure the member to the one or more further members.

21. A method, comprising:
inserting a body of a fastener through a member, wherein an actuator, which is insertable through an opening of the body, is initially in an inactive position, wherein a latch is initially in a non-latching position, and wherein the fastener is initially movable with respect to the member; and
moving the actuator from the inactive position to an active position to protrude the actuator from the body as the actuator moves to the active position,
wherein, in response to the moving the actuator to the active position, an end portion of the actuator causes the latch to move laterally, via a slideable interface comprising a channel structure that engages a corresponding protruding structure between the latch and the body, to a latching position where at least a portion of the latch moves laterally from being behind the opening to being behind the member.

22. The method of claim 21, wherein movement of at least the portion of the latch behind the member facilitates the fastener being secured to the member.

23. An apparatus, comprising:
a latch of a fastener configured to be moved laterally, via a slideable interface positioned between the latch and a body of the fastener and comprising a track that slidably engages a guide, from a non-latching position to a latching position with respect to the body of the fastener, wherein a portion of the fastener comprising the latch is configured to be insertable through a member, wherein, in response to an actuator, which is configured to protrude from the body of the fastener as the actuator moves from an inactive position to an active position, being in the inactive position and the latch being in the non-latching position, the body of the fastener is configured to move with respect to the member and, in response to the actuator being moved to the active position from the inactive position, a part of the actuator that protrudes from the body of the fastener causes the latch to move laterally, as constrained by the slidable interface, to the latching position wherein the latch is behind the member to facilitate securement of the fastener to the member.

24. The apparatus of claim 23, further comprising:
an annular retainer configured to initially retain the latch in the non-latching position.

25. An apparatus, comprising:
means for passing through a member;
means for latching that is movable, with respect to the means for passing through the member, laterally from a non-latching position to a latching position; and
actuation means for protruding from the means for passing through the member as the actuation means moves from an inactive position to an active position,
wherein, in response to the actuation means being in the inactive position and the means for latching being in the non-latching position, the means for passing through the member moves with respect to the member and, in response to the actuation means being moved to the active position, a part of the actuation means that protrudes from the means for passing through the member causes the means for latching to move laterally, as constrained by a channel structure and a corresponding protruding structure between the means for latching and the means for passing through the member, to the latching position wherein the latching means is behind the member to facilitate securement of the apparatus to the member.

* * * * *

UNITED STATES PATENT AND TRADEMARK OFFICE
CERTIFICATE OF CORRECTION

PATENT NO. : 9,506,494 B2
APPLICATION NO. : 14/117618
DATED : November 29, 2016
INVENTOR(S) : Vullings It is certified that error appears in the above-identified patent and that said Letters Patent is hereby corrected as shown below:

In the Specification

In Column 1, Line 7, delete "35U.S.C. §371" and insert -- 35 U.S.C. § 371 --, therefor.

In Column 7, Line 8, delete "buildings Like" and insert -- buildings. Like --, therefor.

Signed and Sealed this
Twenty-fifth Day of April, 2017

Michelle K. Lee
*Director of the United States Patent and Trademark Office*